(12) United States Patent
Mickelson et al.

(10) Patent No.: US 7,147,926 B2
(45) Date of Patent: Dec. 12, 2006

(54) CORROSION-RESISTANT AND STAIN-RESISTANT COMPONENT AND METHOD FOR MANUFACTURING SAME

(75) Inventors: James E. Mickelson, Simpsonville, SC (US); Alan M. Turza, Greenville, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 75 days.

(21) Appl. No.: 10/671,033

(22) Filed: Sep. 25, 2003

(65) Prior Publication Data

US 2005/0069237 A1    Mar. 31, 2005

(51) Int. Cl.
*F16C 33/06* (2006.01)

(52) U.S. Cl. .................. 428/457; 428/621; 428/679; 428/680; 384/278

(58) Field of Classification Search ............... 428/457, 428/621, 679, 680, 701; 384/278, 492, 276
See application file for complete search history.

(56) References Cited

U.S. PATENT DOCUMENTS

| | | | |
|---|---|---|---|
| 4,253,714 A | 3/1981 | Bhushan | |
| 4,842,961 A * | 6/1989 | Basile et al. | 428/679 |
| 5,482,385 A | 1/1996 | Yokota et al. | 384/572 |
| 5,803,614 A | 9/1998 | Tsuji et al. | 384/276 |
| 5,879,816 A | 3/1999 | Mori et al. | 428/621 |
| 5,952,085 A | 9/1999 | Rickerby et al. | 428/216 |
| 5,955,202 A | 9/1999 | Steeg et al. | 428/457 |
| 6,030,681 A | 2/2000 | Czubarow et al. | 428/65.3 |
| 6,062,735 A | 5/2000 | Ward | 384/492 |
| 6,139,191 A | 10/2000 | Andler et al. | 384/276 |
| 6,318,898 B1 | 11/2001 | Ward et al. | 384/492 |
| 6,541,137 B1 * | 4/2003 | Kingon et al. | 428/701 |

* cited by examiner

*Primary Examiner*—Lenard A. Footland
(74) *Attorney, Agent, or Firm*—Patrick S. Yoder; Alexander M. Gerasimow

(57) ABSTRACT

A multi-layer corrosion protection system and a method for applying the multi-layer corrosion protection system. The system comprises a corrosion-resistant layer plated onto a metallic substrate. The corrosion-resistant layer may be deposited using an autocatalytic (electroless) process. The corrosion-resistant layer may comprise phosphorous. The system comprises a stain-resistant layer deposited over the corrosion-resistant layer. The stain-resistant layer may be deposited using an autocatalytic (electroless) process. The stain-resistant layer may comprise nickel. The system may also comprise an inner layer plated onto the metallic substrate to prepare the metallic substrate for the application of the corrosion-resistant layer. The inner layer may comprise nickel and may be deposited using an autocatalytic (electroless) process.

4 Claims, 4 Drawing Sheets

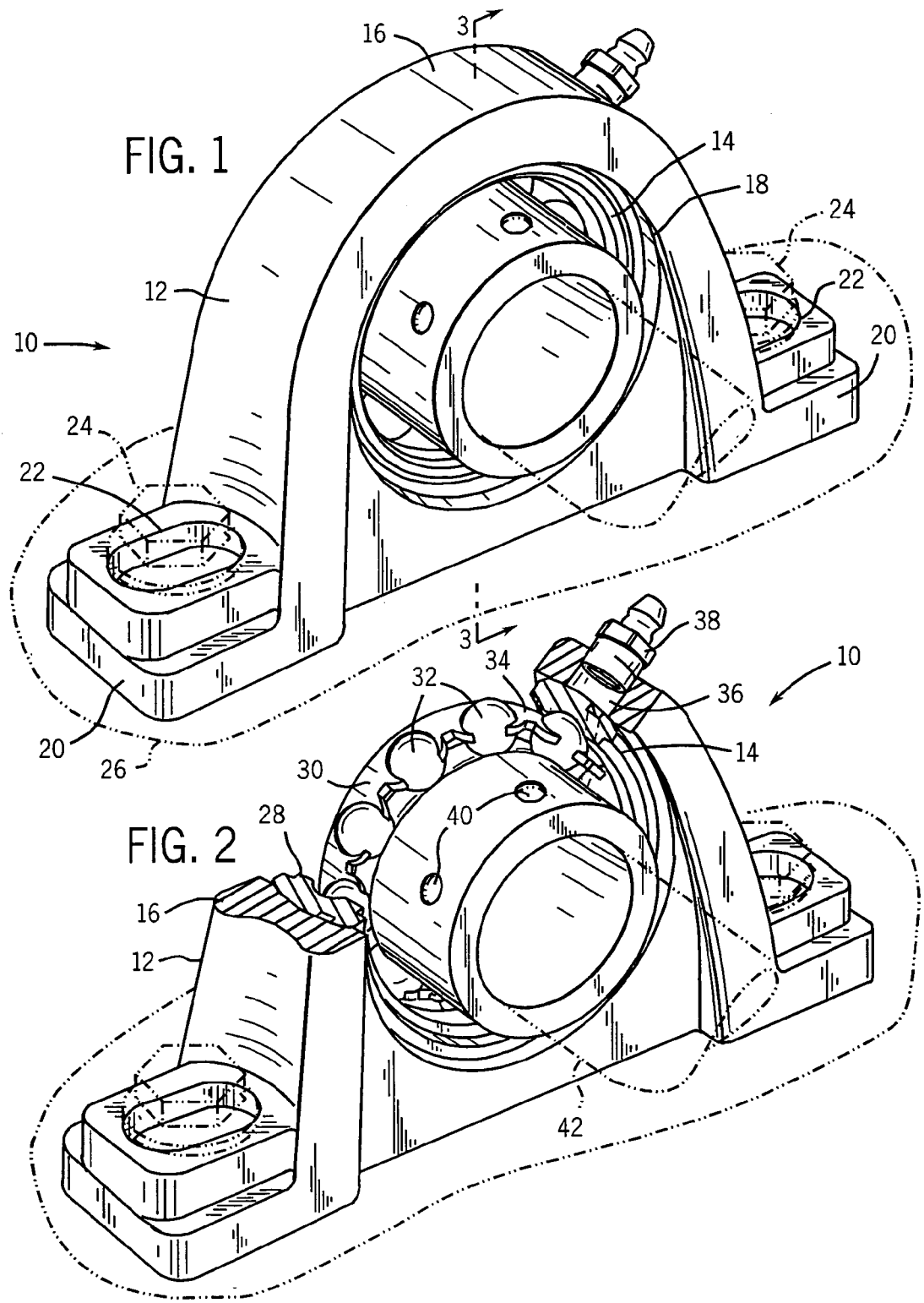

CORROSION-RESISTANT AND STAIN-RESISTANT COMPONENT AND METHOD FOR MANUFACTURING SAME

BACKGROUND OF THE INVENTION

1. Field of the Invention

The present invention relates generally to the field of materials for use in mechanical systems. More particularly, the invention relates to a technique for rendering surfaces corrosion-resistant and stain-resistant for use in food and beverage, chemical, marine, and similar potentially corrosive applications.

2. Description of the Related Art

A number of applications exist for a device to be used in an environment, which may degrade, corrode or otherwise attack the metal used to construct the device. For example, in many chemical and marine environments, water, and other liquids, as well as trace chemicals such as salts, corrosives, acids, and the like in the air surrounding a bearing assembly may chemically attack the metal components used in the bearing assembly. In other applications, such as in the food and beverage industry, frequent wash downs of production or processing lines with water and detergents or high pressure steam may both chemically and mechanically attack metal components of the production lines. In either case, degradation of the bearing components may take the form of oxidation products, such as white or red rust formed on ferrous substrates, or staining of the bearing components.

In applications such as those in the food and beverage industry, this degradation is unacceptable, and may call for immediate replacement of affected bearings, leading to additional expense and possible down time. Therefore, a need exists for a technique to prevent degradation of metal components in harsh operating environments.

BRIEF DESCRIPTION OF THE DRAWINGS

The foregoing and other advantages and features of the invention will become apparent upon reading the following detailed description and upon reference to the drawings in which:

FIG. 1 is a perspective view of a bearing including a bearing set protected by a technique in accordance with aspects of the present invention disposed within a bearing housing;

FIG. 2 is a perspective view of the bearing illustrated in FIG. 1 with a portion of the housing broken away to illustrate the interior components of the bearing set;

DETAILED DESCRIPTION OF SPECIFIC EMBODIMENTS

Figure 3:
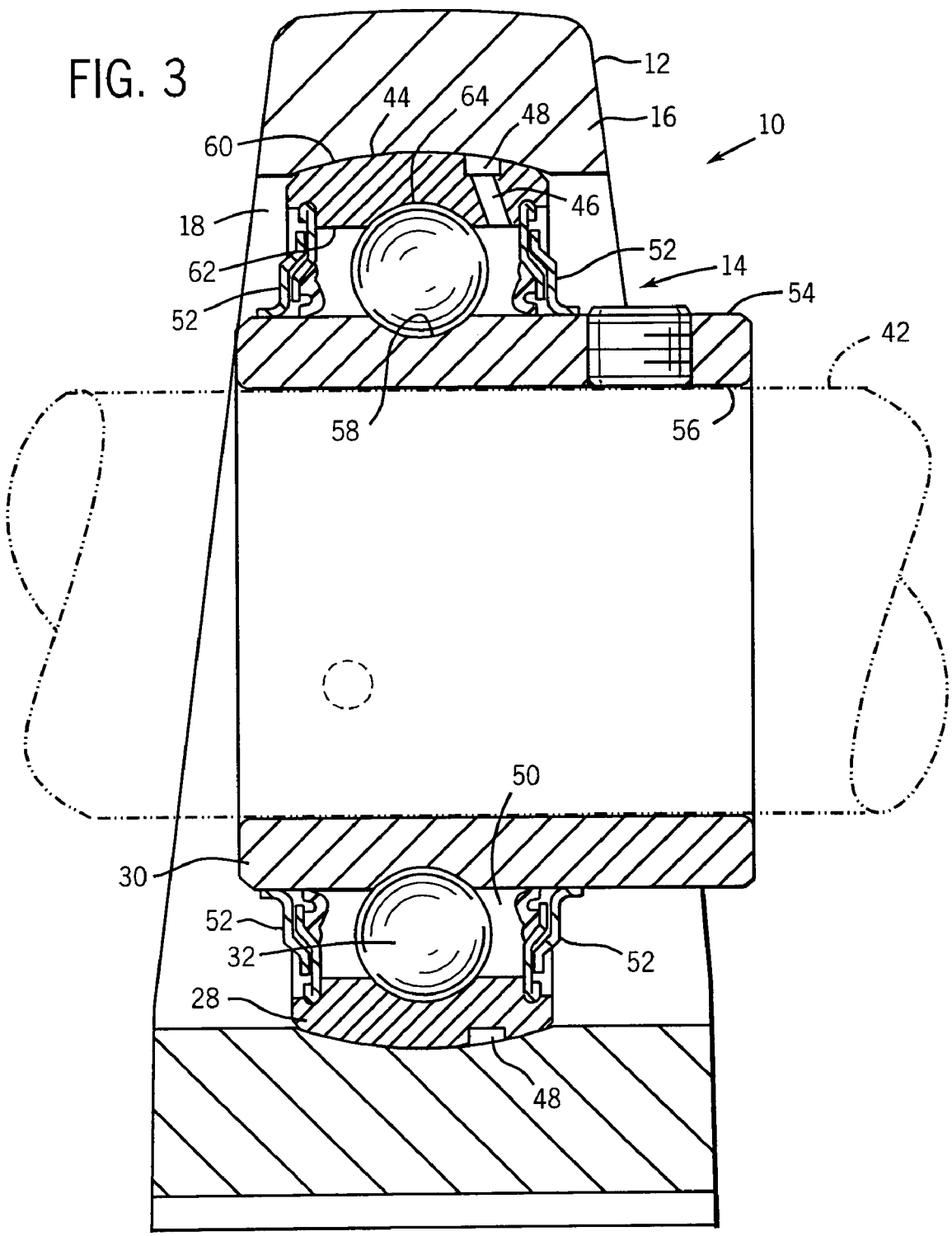
FIG. 3 is a sectional view of the bearing shown in FIGS. 1 and 2, sectioned along line 3—3 of FIG. 1, to illustrate the various components of the bearing set.

Turning now to the drawings, and referring first to FIGS. 1 and 2, a bearing assembly, designated generally by the reference numeral 10, is illustrated as including a housing 12 and a bearing insert 14 positioned in the housing. One or more of the components of the bearing assembly 10 has a series of protective layers that resist corrosion and staining when the components are exposed to a harsh environment.

In the embodiment illustrated in the Figures, housing 12 is a pillow block style housing, including a central support 16 through which an aperture 18 is formed for receiving bearing insert 14. Attachment flanges or feet 20 extend from central support 16 and include apertures 22 designed to receive fasteners 24 for securing bearing 10 to a support surface 26.

As best illustrated in FIG. 2, the bearing insert shown includes an outer ring 28, an inner ring 30, and a plurality of bearing elements 32 in the form of ball bearings received between the outer and inner rings. The bearing elements may be conveniently positioned in a retainer or cage 34 and are free to rotate within the cage and with respect to the inner and outer rings to provide for free rotation of one ring with respect to another. Also as illustrated in FIG. 2, central support 16 of housing 12 includes a lubricant passage 36 in which a lubricant fitting 38 is positioned. As described more fully below, lubricant fitting 38 permits lubricant, such as grease, to be pumped into the region between outer and inner rings 28 and 30 via passage 36, thereby providing lubrication for the bearing components, and inhibiting the ingress of dirt and contamination into the operational region of the bearing elements. Also as shown in FIG. 2, inner ring 30 may include one or more threaded apertures 40 for receiving set screws or similar fasteners used to properly position a shaft 42 in bearing 10.

As will be appreciated by those skilled in the art, the present technique for preventing or inhibiting degradation of bearing components may be applied to various styles and configurations of bearings. For example, while the pillow block style bearing housing is illustrated in the Figures, the present technique may be applied to bearing housings in two or four-bolt flanged bearing housings, tapped-base housings, and so forth. Similarly, the present technique may be applied to a variety of designs of bearing inserts. Thus, while ball bearings are illustrated in the Figures, the technique may be equally well applied to bearing assemblies including needle bearings, roller bearings, tapered roller bearings, thrust bearings, journal bearings, and so forth. Moreover, the present technique may be used in bearing arrangements permitting lubrication and access to internal volumes, or in sealed arrangements. In addition, the technique may be used in devices other than bearings.

FIG. 3 illustrates the bearing of FIGS. 1 and 2 in vertical section. As shown in FIG. 3, housing 12 preferably forms a spherical bearing seat 44 surrounding aperture 18. Bearing insert 14 is received within and supported by this spherical bearing seat. A lubricant passage 46 may be formed in outer ring 28, in fluid communication with an annular groove 48 formed in the outer ring to permit lubricant to be transmitted from the annular lubricant groove into an interior cavity 50 formed between outer ring 28 and inner ring 30 in which bearing elements 32 are positioned. Moreover, seal assemblies 52 are provided between outer ring 28 and inner ring 30 to maintain lubricant thus injected into cavity 50, and to prevent the ingress of contaminants, water, and so forth, into the cavity.

In accordance with the present technique, one or more of the bearing components is provided with several protective layers. Such layers may be provided on surfaces of outer ring 28, inner ring 30, or on additional components included in the bearing insert or housing. In the illustrated embodiment, for example, inner ring 30 includes an outer surface 54, an inner surface 56, and forms, along outer surface 54, an inner race 58. As best shown in FIG. 3, inner race 58 is designed to receive and bear against bearing components 32 positioned between the inner and outer rings. Similarly, outer ring 28 includes an outer surface 60, an inner surface 62, and an outer race 64 formed as an annular groove within inner surface 62. The protective layers may extend over any or all of surfaces 54, 56, 58, 60, 62 and 64, as well as over additional surfaces between these surfaces, or over surfaces of housing 12, where desired. In the following discussion, however, reference is made to specific regions of the inner ring 30 for the sake of simplicity.

Figure 4:
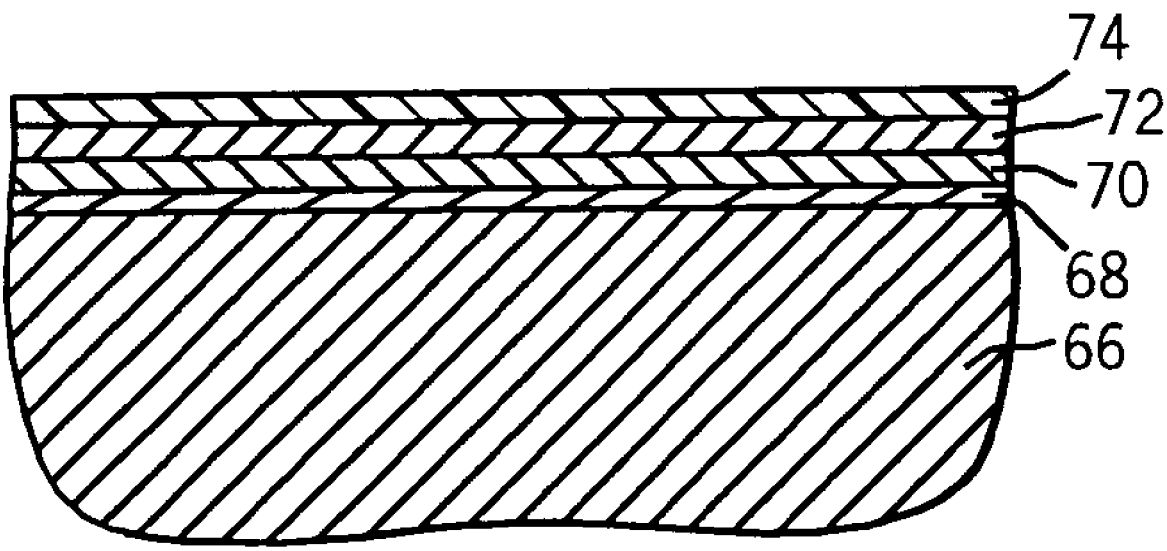
FIG. 4 is a sectional view illustrating protective layers disposed on a substrate of a component of the bearing shown in FIGS. 1–3 in accordance with certain aspects of the present technique; and, FIG. 5 is a flow chart illustrating steps in preparing a bearing component with layered protection of the type shown in FIG. 3.

A detailed view of the stain and corrosion resistant protective layering is illustrated in FIG. 4. The bearing component or components, such as inner ring 30, comprises a metallic substrate 66 which may be made of any suitable material, such as steel. After preparation of the substrate surface to accept the plating, a nickel layer 68 is applied to the substrate 66 using an electrolytic process. Preferably, the electrolytic process used is Wood's nickel strike. In the illustrated embodiment, a nickel-phosphate alloy layer 70 is then deposited over nickel layer 68 using an autocatalytic (electroless) process. However, other coating materials may be used. The nickel-phosphate alloy layer 70 is preferably applied to a nominal thickness of approximately between 0.00005 and 0.0005 inches, and preferably approximately 0.000250 inches (6.35 μm) or below over the entire surface of the bearing component. The nickel-phosphate alloy layer 70 resists corrosion. Moreover, all of the components of the bearing structure described above may be plated in this manner.

Previous bearings coated with an electroless nickel-phosphate layer have experienced staining when used in production lines in the food and beverage industry. It has been established that the staining is due to a reaction between the phosphate in the nickel-phosphate layer and the chlorinated chemicals used to clean the bearings. It addition, it has been established that a layer of nickel disposed over the nickel-phosphate layer will prevent the chlorinated chemicals from reacting with the phosphorous, and thereby prevent the bearing surfaces from being stained. Therefore, in the illustrated embodiment, an additional nickel layer 72 is applied to the substrate 66 to resist staining. As discussed above, the additional nickel layer 72 prevents the chlorinated chemicals used to wash down the bearings from reacting with the phosphate in the nickel-phosphate layer 70 below the nickel layer 72. In addition, the additional nickel layer 72 provides additional corrosion resistance. Preferably, the nickel layer 72 is applied using an electrolytic process, such as Wood's nickel strike.

The resulting protective layers may be subjected to the pressures of normal wear during the life of the bearing assembly, and provides superior corrosion protection in an economical manner. As a further corrosion inhibiting and finishing layer, in the embodiment of FIG. 4, a top coat 74 of polytetrafluoroethylene (PTFE) is applied over outer nickel layer 72. If used, the PTFE is preferably formed to a thickness of approximately 0.0002 inches. The PTFE layer is preferably provided with an ultraviolet fluorescent marker. Where the top coat 74 contains an ultraviolet fluorescent marker, the resulting component fluoresces when exposed to an ultraviolet light source. The marker may thus be used to provide assurance to the manufacturer and to the end user that a corrosion-resistant bearing component has been obtained or is being installed. Moreover, the ultraviolet marker provides an in-application indicator to the customer that the useful corrosion protected life of the bearing is approaching an end, typically indicated by a gradual fading and eventual disappearance of the UV marker. It should be noted, however, that the fading does not indicate a complete wear of the remaining corrosion-resistant layers through to the substrate material, but may be used to indicate progressive wear. Finally, the combination of the foregoing protective layers provides a cosmetic post-plate appearance which is both satin bright and highly lustrous, resembling the appearance of polished stainless steel.

Figure 5:
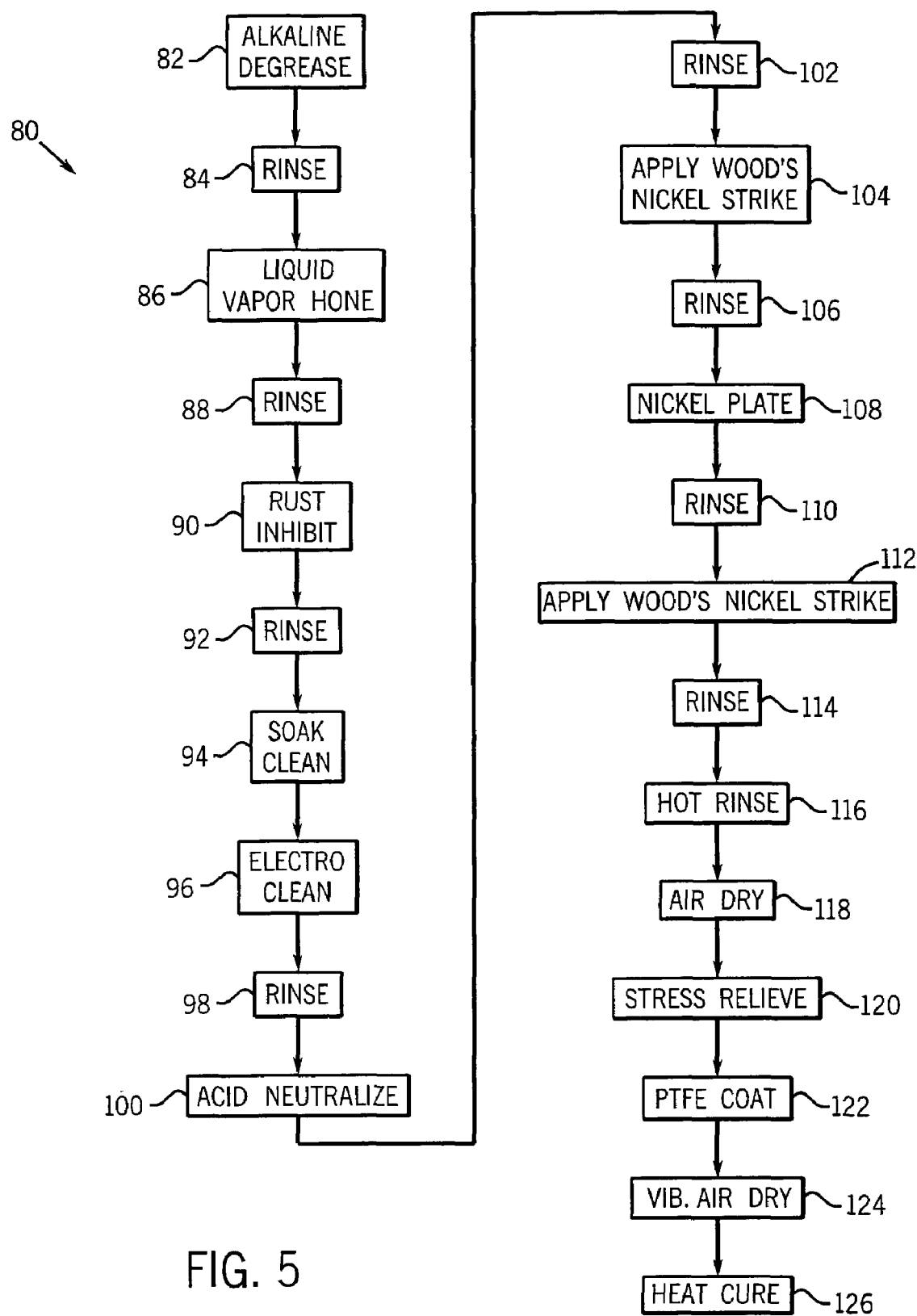

FIG. 5 illustrates a block diagram of an exemplary method of applying the protective layers, represented generally by reference numeral 80. A plurality of processes are performed to prepare the substrate of a pre-formed bearing component for the application of the protective layers. In the illustrated method, the substrate of the pre-formed bearing component is alkaline degreased, as represented by block 82. The degreasing may be performed with a biodegradable degreaser, such as Clepo-455-A available from McDermid of Waterbury, Conn. After degreasing, the clean substrate is rinsed with cold water, as represented by block 84. In the illustrated method, the substrate also is liquid vapor honed, as represented by block 86. The honing may be performed through any suitable method, such as honing employing compounds such as fine grit aluminum oxide. Alternatively, the substrate may be cleaned by an ultrasonic cleaner. After honing, the substrate is again rinsed with cold water, as represented by block 88.

In the illustrated method, a rust inhibitor is applied to the cleaned substrate, as represented by block 90. This rust inhibitor is preferably a non-petroleum rust inhibiting product, such as NRP-Oakite from Oakite Products, Inc. of Berkeley Heights, N.J. The rust inhibitor may be applied by any suitable process, such as immersion. After the application of the rust inhibitor, the resulting substrate is again cold water rinsed, as represented by block 92. The substrate is soak cleaned, such as in a solution of Kemtex-88 from McDermid of Waterbury, Conn. In the illustrated method, the substrate is electro-cleaned, such as by Kemtex-88, as represented by block 96. After electro-cleaning, the substrate is again cold water rinsed, as represented by block 98. The structure is acid neutralized in the illustrated method, as represented by block 100. This acid neutralization may be performed by application of weak sulfuric acid. After acid neutralization, the substrate is rinsed, as represented by block 102.

After the substrate has been prepared, a strike plate of nickel 68 is deposited on the substrate, as represented by block 104. The substrate is disposed on a rack within a Wood's nickel strike. The Wood's nickel strike bath comprises an electrolytic solution, such as nickel chloride and hydrochloric acid. However, other electrolytes may be used. A negative charge is applied to the substrate through the rack. A positively-charged nickel rod is inserted into the strike bath to serve as an anode. The nickel ions from the anode buildup in the solution and are attracted to the positively-charged substrate, forming a thin metallic coating or "strike." Following application of the nickel strike, the substrate is rinsed, as represented by block 106.

After the application of the nickel strike, an autocatalytic (electroless) process is used to plate the substrate over the nickel strike 68, as represented by block 108. In the illustrated method, the process proceeds by positioning the substrates in a nickel-phosphate bath, causing an autocatalytic reaction (reduction) to deposit the nickel-phosphate layer 70 on the surface of the nickel strike layer 68. However, other baths may be used to deposit other layers on the substrate. Various chemical baths may be commercially obtained, such as from Atotech USA. The composition of the bath employed for the plating process is subject to some variation depending upon the chemicals and compositions employed, but is generally an aqueous solution of nickel and phosphorous. The thickness of the resulting plated layer is generally a function of the chemistry employed in the bath, the temperature to which the bath is raised, and the duration of time to which the parts are subjected to the heated bath, and preferably falls within the range described above. However, as opposed to electrolytic processes, such autocatalytic plating generally does not require the parts to be manually mounted in support structures, coupled to electrodes, moved within the support structures to provide overall plating of the surfaces, and so forth. In addition, the plating thickness tends to be uniform compared to electroplating due to the absence of electric fields and the associated problems in making them uniform. After the autocatalytic (electroless) process, the plated substrate is rinsed with cold water, as represented by block 110.

After the application of the autocatylytic (electroless) layer, the outer nickel strike 72 is deposited over the autocatylytic (electroless) layer 70, as represented by block 108.

Preferably, the same process is used to apply the outer nickel strike 72 as is used to apply the inner nickel strike 68, thereby reducing manufacturing and tooling expenses. The outer nickel strike 72 prevents external fluids from reacting with the phosphorous in the autocatalytic (electroless) layer 70. Where desired, the coated substrate is cold water rinsed, as represented by block 114, and hot water rinsed in a bath at approximately 160° Fahrenheit, as represented by block 116. Afterward, the coated, cleaned substrate is air dried, as represented by block 118. The substrates may be heat treated, such as for stress relief, as represented by block 120. In a presently preferred embodiment, stress relief is performed by positioning the substrate in a heat treating oven at approximately 375° Fahrenheit for a period of four hours.

In the illustrated method, the coated substrates are PTFE coated, as represented by block 122. Commercially available PTFE coatings, with and without ultraviolet fluorescent markers, are commercially available from various manufacturers, such as RO-59, Inc. of Stoughton, Mass. The coated substrates are vibratory air dried, as represented by block 124. At block 126, where desired, the PTFE coating is heat cured, such as by subjecting the plated and coated substrate to a temperature of approximately 200° Fahrenheit for a period of 30 minutes.

The techniques described above, provide a bearing surface with corrosion and stain resistant properties. While the invention may be susceptible to various modifications and alternative forms, specific embodiments have been shown by way of example in the drawings and have been described in detail herein. However, it should be understood that the invention is not intended to be limited to the particular forms disclosed. Thus, the technique for providing a corrosion and stain resistant surface may be used with a plurality of different bearing surfaces, and with surfaces other than bearing surfaces. For example, the technique may be applied to any type of bearing product, including ball, roller, and needle antifriction annular bearings, as well as to linear bearings and plain bearings. Rather, the invention is to cover all modifications, equivalents, and alternatives falling within the spirit and scope of the invention as defined by the following appended claims.

What is claimed is:

1. An apparatus, comprising:
    a metallic substrate;
    an electroless nickel alloy layer disposed over the metallic substrate, wherein the electroless nickel alloy layer comprises phosphorous;
    an outer electrolytic nickel layer disposed over the electroless nickel alloy layer; and
    an inner electrolytic nickel layer disposed over the metallic substrate, wherein the electroless nickel alloy layer is disposed over the inner electrolytic nickel layer.

2. The apparatus as recited in claim 1, comprising a polymeric coating layer disposed over the outer electrolytic nickel layer.

3. The apparatus as recited in claim 1, wherein the outer electrolytic nickel layer consists essentially of nickel.

4. An apparatus, comprising:
    a metallic substrate;
    a first Wood's nickel strike layer disposed over the metallic substrate;
    an electroless nickel-containing layer disposed over the first Wood's nickel strike layer;
    a second Wood's nickel strike layer disposed over the electroless nickel layer; and
    a polymeric layer disposed over the second Wood's nickel strike layer.

* * * * *